(12) United States Patent
Pylvanainen et al.

(10) Patent No.: US 9,025,051 B2
(45) Date of Patent: May 5, 2015

(54) METHOD AND APPARATUS FOR AUTOMATICALLY RENDERING DOLLY ZOOM EFFECT

(71) Applicant: Nokia Technologies Oy, Espoo (FI)

(72) Inventors: Timo Pekka Pylvanainen, Menlo Park, CA (US); Timo Juhani Ahonen, Redwood City, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/780,885

(22) Filed: Feb. 28, 2013

(65) Prior Publication Data

US 2014/0240553 A1    Aug. 28, 2014

(51) Int. Cl.
| H04N 5/262 | (2006.01) |
| H04N 5/225 | (2006.01) |
| H04N 5/228 | (2006.01) |
| H04N 5/232 | (2006.01) |

(52) U.S. Cl.
CPC .................. H04N 5/23296 (2013.01)

(58) Field of Classification Search
CPC .................................................. H04N 5/23296
USPC ..................... 348/208.14, 169–172
See application file for complete search history.

(56) References Cited

U.S. PATENT DOCUMENTS

| 6,449,019 B1* | 9/2002 | Fincher et al. ................. 348/578 |
| 8,224,023 B2* | 7/2012 | Greig ............................ 382/103 |
| 8,675,953 B1* | 3/2014 | Elwell et al. ................. 382/154 |
| 2004/0258152 A1* | 12/2004 | Herz ......................... 375/240.16 |
| 2009/0028386 A1 | 1/2009 | Michimoto et al. |
| 2010/0141772 A1 | 6/2010 | Inaguma et al. |
| 2010/0277596 A1* | 11/2010 | Nakamura et al. ............. 348/169 |
| 2010/0318914 A1* | 12/2010 | Zitnick et al. ................. 715/719 |
| 2011/0096228 A1 | 4/2011 | Deigmoeller et al. |
| 2011/0267499 A1* | 11/2011 | Wan et al. ................. 348/231.99 |
| 2011/0267503 A1* | 11/2011 | Kunishige et al. ......... 348/240.1 |
| 2012/0188231 A1* | 7/2012 | Deb et al. ....................... 345/419 |

OTHER PUBLICATIONS

International Search Report and Written Opinion from International Application No. PCT/FI2014/050070, mailed May 21, 2014.
Written Opinion from International Application No. PCT/FI2014/050070, mailed May 21, 2014.
"Dolly Zoom" [online] [retrieved Jun. 11, 2014]. Retrieved from the Internet: https://www.youtube.com/watch?v=iv41W6iyyGs.

* cited by examiner

*Primary Examiner* — Tuan Ho
*Assistant Examiner* — Shahbaz Nazrul
(74) *Attorney, Agent, or Firm* — Alston & Bird LLP

(57) ABSTRACT

Various methods are provided for automatically adjusting a zoom feature in accordance with a camera movement to perform a dolly zoom effect. One example method may include causing reception of a first image frame from video data, wherein the first image frame comprises two or more interest points, causing reception of a second image frame from the video data, wherein the second image frame comprises the two or more interest points in a different location, and tracking a difference in location of the two or more interest points from the first image frame to the second image frame. The method may also include calculating a scaling factor and applying the scaling factor to the second image frame.

18 Claims, 7 Drawing Sheets

METHOD AND APPARATUS FOR AUTOMATICALLY RENDERING DOLLY ZOOM EFFECT

TECHNOLOGICAL FIELD

Embodiments of the present invention relate generally to media content and, more particularly, relate to a method, apparatus, and computer program product for automatically adjusting a zoom feature in accordance with a camera movement to perform a dolly zoom effect.

BACKGROUND

At public events, such as concerts, theater performances and/or sports, it is increasingly popular for users to capture these public events using a camera and then store the captured events as media content, such as an image, a video, an audio recording and/or the like. Media content is even more frequently captured by a camera or other image capturing device attached to a mobile terminal. However, mobile terminals don't provide hardware of software capability to perform cinematographic effects.

Dolly zoom, the cinematographic effect characterized by setting a zoom lens to adjust the angle of view while the camera moves toward or away from a subject, is difficult to achieve. Currently, a high end camera is needed to achieve the effect. A non-professional will typically need to try the shot multiple times to achieve the effect even with professional equipment. Most user interfaces of camera equipped mobile telephones do not allow continuous zoom, but instead typically employ a particular set of fixed zoom steps. Second, manually adjusting a zoom setting with the current user interfaces is not flexible enough. In general, matching the speed of the camera motion with the correct change in focal length is very challenging with high end cameras and impossible with mobile phone cameras.

BRIEF SUMMARY

A method, apparatus and computer program product are therefore provided according to an example embodiment of the present invention to automatically adjust a zoom feature in accordance with a camera movement to create a dolly zoom effect. Furthermore, adjustment of the zoom feature is done with image analysis rather than with a manual operation of the zoom feature by the user. The method, apparatus and computer program product according to an example embodiment may also be configured to determine a crop area in the case of post recording image processing to show a dolly zoom effect.

One example method may include causing reception of a first image frame from video data, wherein the first image frame comprises two or more interest points, causing reception of a second image frame from the video data, wherein the second image frame comprises the two or more interest points in a different location, tracking a difference in location of the two or more interest points from the first image frame to the second image frame, calculating a scaling factor representing a relative difference in placement of the two or more interest points, and applying, by a processor, the scaling factor to the second image frame. The method may further include receiving a selection of the two or more interest points in the first image frame. In an alternative embodiment, the method may further include receiving selection of a main subject in the first image frame and selecting the two or more interest points in accordance with the selection of the main subject.

In another embodiment, the method may include causing a descriptor for each of the two or more interest points to be stored and updating the descriptor for each of the two or more interest points in response to the calculation of the scaling factor. Furthermore, applying the scaling factor may comprise causing adjustment of an optical or digital zoom feature of a camera device. Alternatively, applying the scaling factor may comprise selecting a crop area such that a ratio of distances between two sets of interest points is kept constant. In another embodiment, the method may include transforming the second image frame by applying the scaling factor; and causing presentation of the first image frame and a transformed second image frame, wherein the transformed second image frame.

An example apparatus may include at least one processor and at least one memory storing computer program code, wherein the at least one memory and stored computer program code are configured, with the at least one processor, to cause the apparatus to cause reception of a first image frame from video data, wherein the first image frame comprises two or more interest points, cause reception of a second image frame from the video data, wherein the second image frame comprises the two or more interest points in a different location, track a difference in location of the two or more interest points from the first image frame to the second image frame, calculate a scaling factor representing a relative difference in placement of the two or more interest points, apply the scaling factor to the second image frame. The at least one memory and stored computer program code are further configured, with the at least one processor, to cause the apparatus to receive a selection of the two or more interest points in the first image frame. In an alternative embodiment, the at least one memory and stored computer program code are further configured, with the at least one processor, to cause the apparatus to receive selection of a main subject in the first image frame and selecting the two or more interest points in accordance with the selection of the main subject.

The at least one memory and stored computer program code are further configured, with the at least one processor, to cause the apparatus to cause a descriptor for each of the two or more interest points to be stored and updating the descriptor for each of the two or more interest points in response to the calculation of the scaling factor. Furthermore, applying the scaling factor may comprise causing adjustment of a zoom feature of a camera device. Alternatively, applying the scaling factor may comprise selecting a crop area such that a ratio of distances between two sets of interest points is kept constant. In another embodiment, the at least one memory and stored computer program code are further configured, with the at least one processor, to cause the apparatus to transform the second image frame by applying the scaling factor; and cause presentation of the first image frame and a transformed second image frame, wherein the transformed second image frame.

In a further embodiment, a computer program product is provided that includes at least one non-transitory computer-readable storage medium having computer-readable program instructions stored therein, the computer-readable program instructions includes program instructions configured for causing reception of a first image frame from video data, wherein the first image frame comprises two or more interest points, causing reception of a second image frame from the video data, wherein the second image frame comprises the two or more interest points in a different location, tracking a difference in location of the two or more interest points from the first image frame to the second image frame, calculating a scaling factor representing a relative difference in placement of the two or more interest points, and applying, by a processor, the scaling factor to the second image frame. The computer-readable program instructions also include program instructions configured for receiving a selection of the two or more interest points in the first image frame. In an alternative embodiment, the computer-readable program instructions also include program instructions configured for receiving selection of a main subject in the first image frame and selecting the two or more interest points in accordance with the selection of the main subject.

The computer-readable program instructions also include program instructions configured for causing a descriptor for each of the two or more interest points to be stored and updating the descriptor for each of the two or more interest points in response to the calculation of the scaling factor. Furthermore, applying the scaling factor may comprise causing adjustment of a zoom feature of a camera device. Alternatively, applying the scaling factor may comprise selecting a crop area such that a ratio of distances between two sets of interest points is kept constant. In another embodiment, the computer-readable program instructions also include program instructions configured for transforming the second image frame by applying the scaling factor; and causing presentation of the first image frame and a transformed second image frame, wherein the transformed second image frame.

One example apparatus may include means for causing reception of a first image frame from video data, wherein the first image frame comprises two or more interest points, causing reception of a second image frame from the video data, wherein the second image frame comprises the two or more interest points in a different location, tracking a difference in location of the two or more interest points from the first image frame to the second image frame, calculating a scaling factor representing a relative difference in placement of the two or more interest points, and applying, by a processor, the scaling factor to the second image frame. The apparatus may further include means for receiving a selection of the two or more interest points in the first image frame. In an alternative embodiment, The apparatus may further include means for receiving selection of a main subject in the first image frame and selecting the two or more interest points in accordance with the selection of the main subject.

The apparatus may further include means for causing a descriptor for each of the two or more interest points to be stored and updating the descriptor for each of the two or more interest points in response to the calculation of the scaling factor. Furthermore, applying the scaling factor may comprise causing adjustment of a zoom feature of a camera device. Alternatively, applying the scaling factor may comprise selecting a crop area such that a ratio of distances between two sets of interest points is kept constant. In another embodiment, the apparatus may further include means for transforming the second image frame by applying the scaling factor; and causing presentation of the first image frame and a transformed second image frame, wherein the transformed second image frame.

BRIEF DESCRIPTION OF THE DRAWINGS

Figure 1:
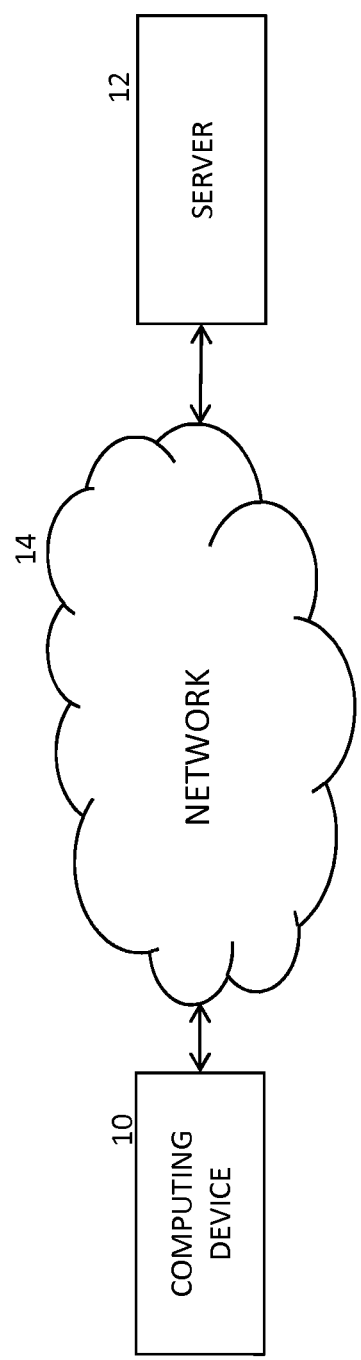
Figure 2:
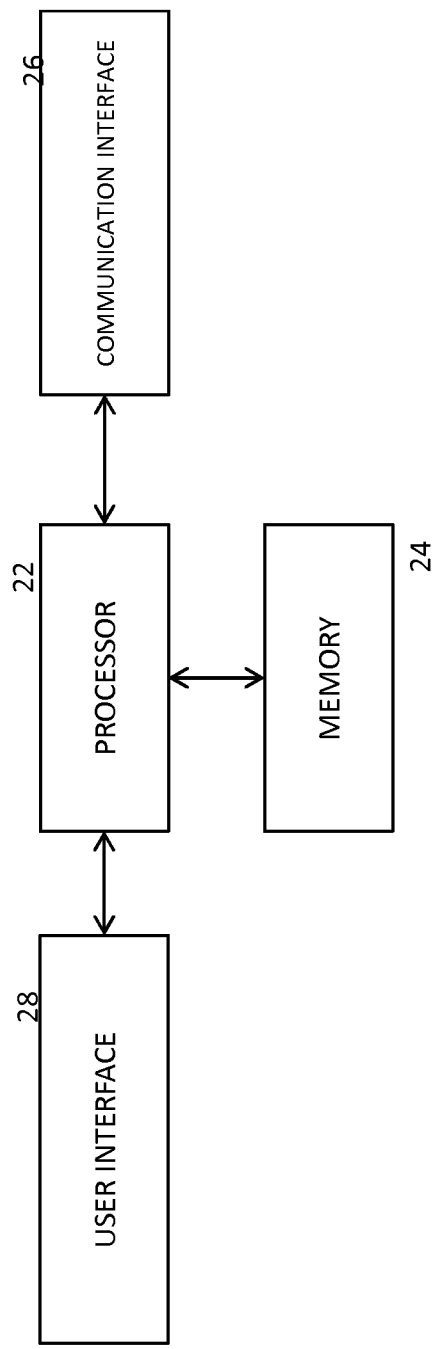
Figure 3:
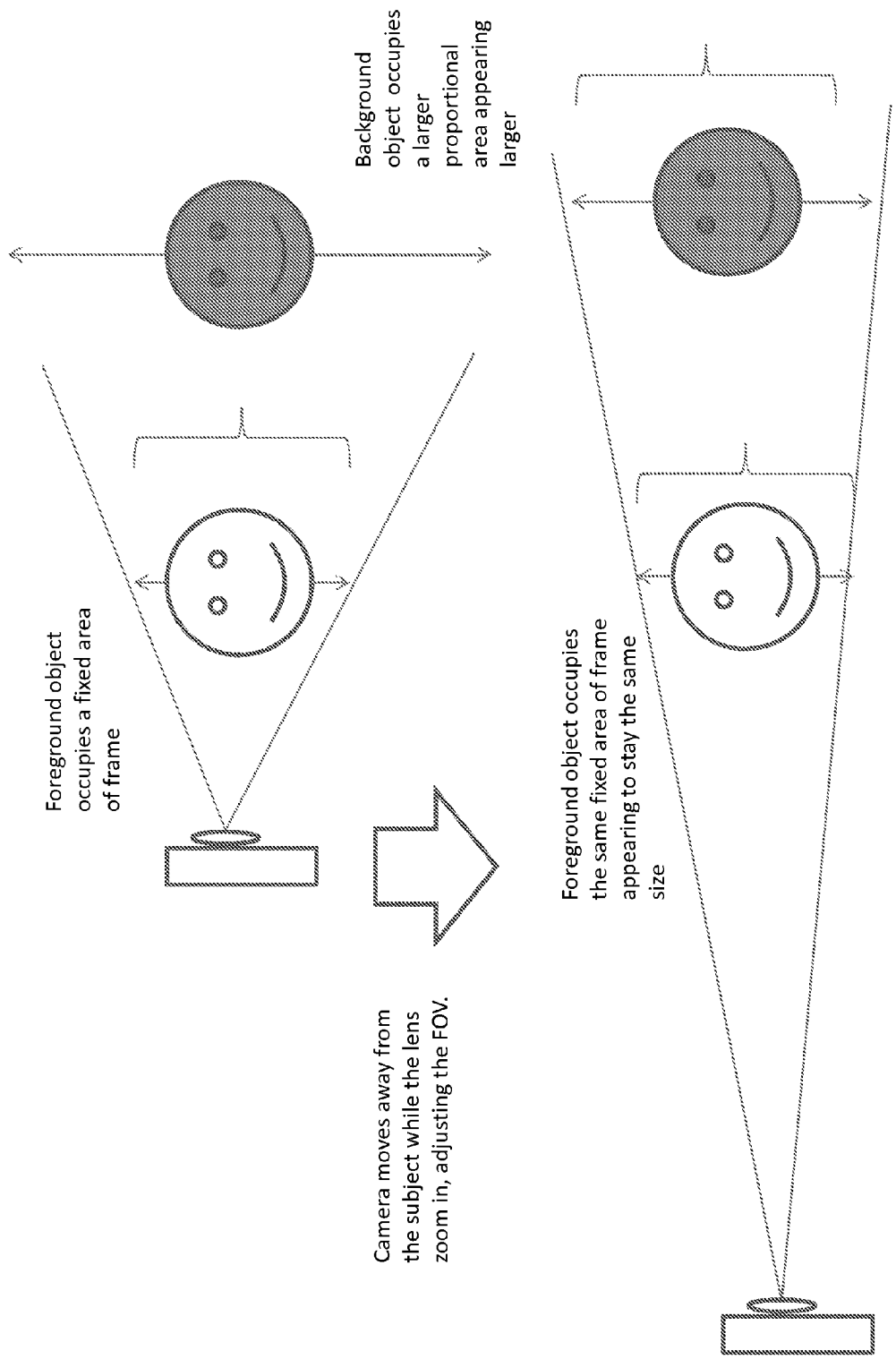

Having thus described embodiments of the invention in general teems, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is an example illustration showing the dolly zoom effect.

Figure 4:
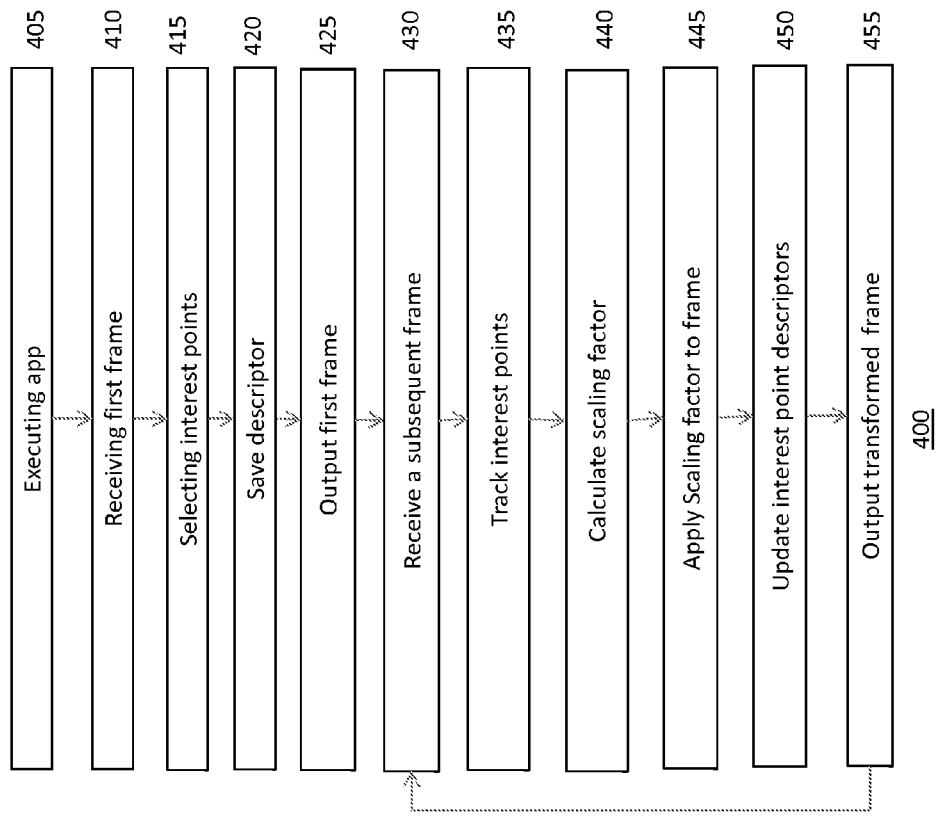
Figure 5:
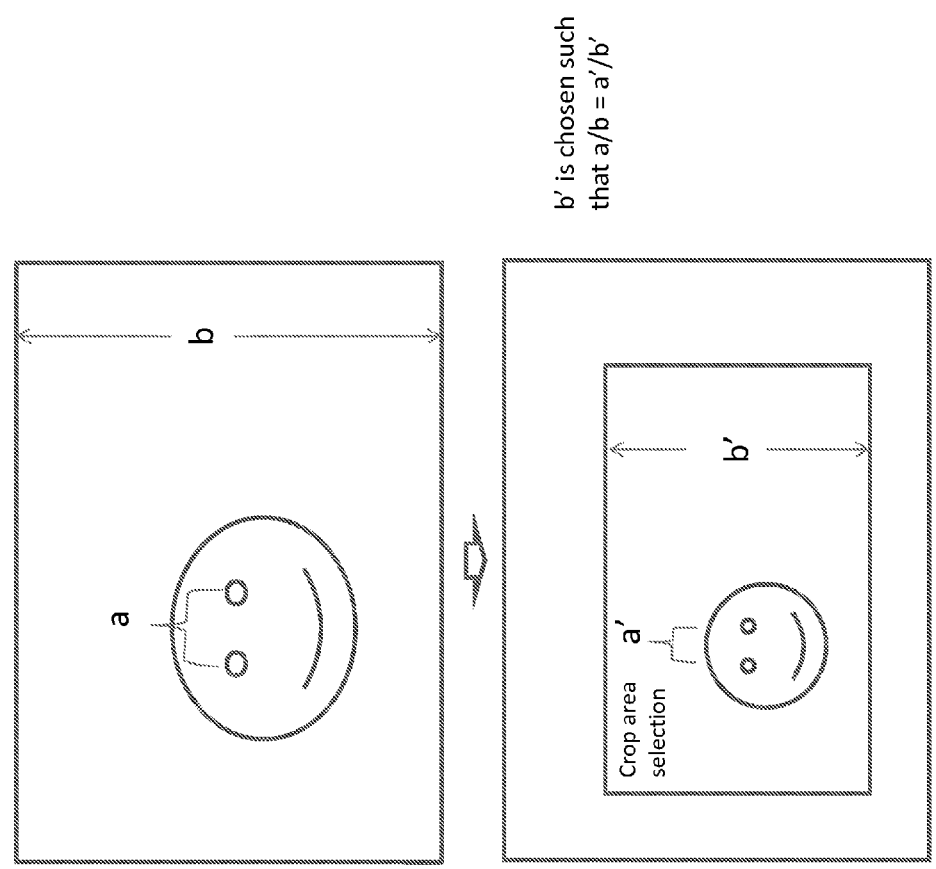
Figure 6:
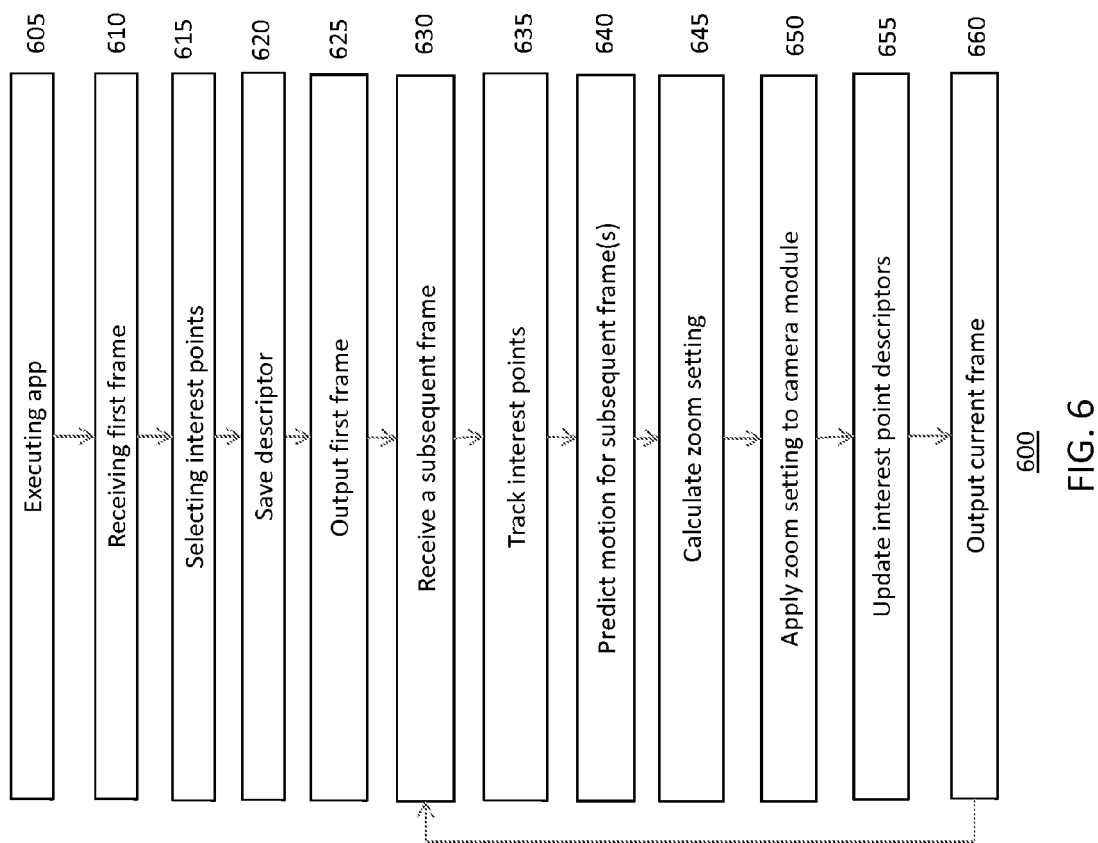
Figure 7:
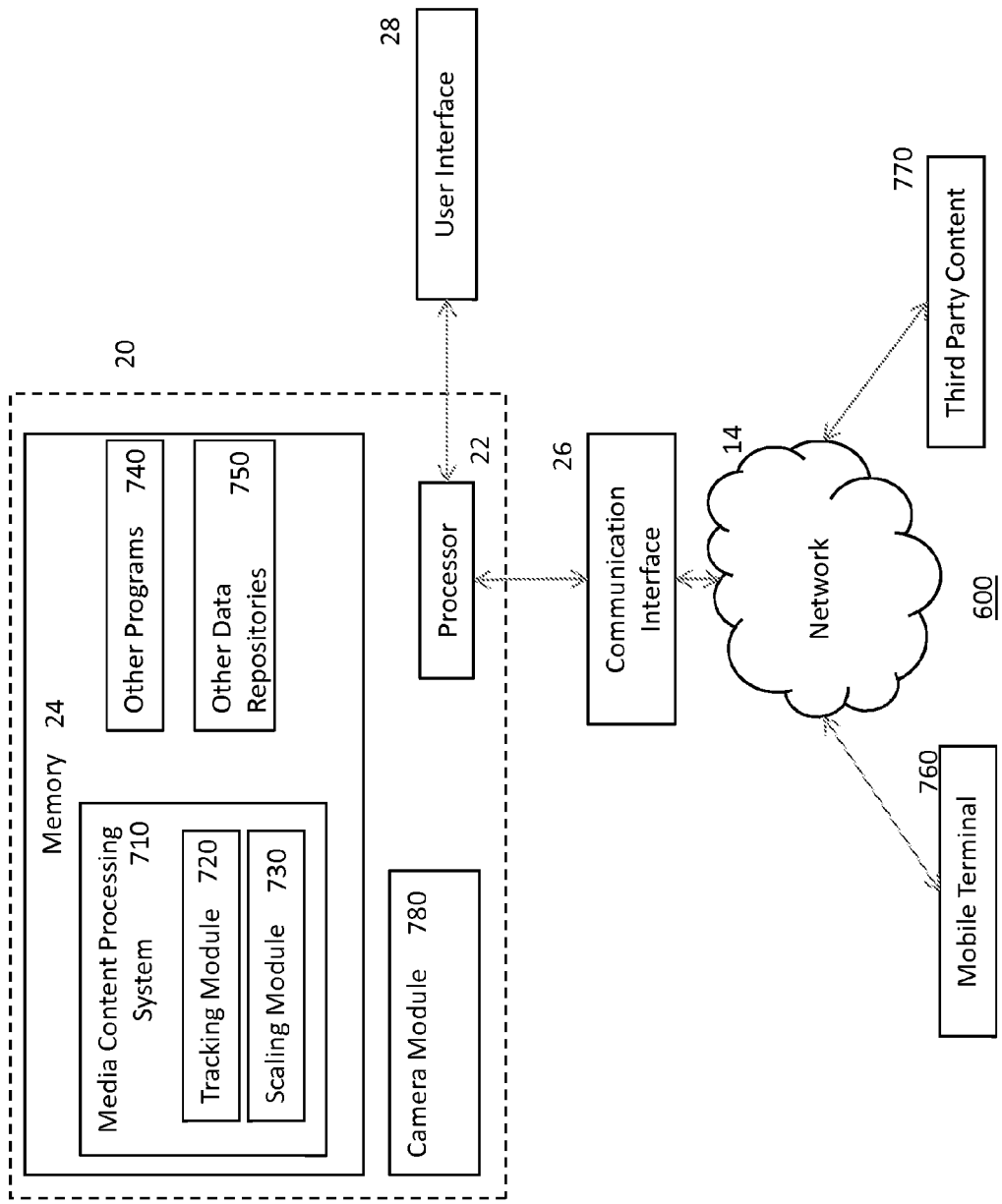

FIG. 4 is an example flowchart illustrating a method of operating an example apparatus in accordance with an embodiment of the present invention;

FIG. 5 is an example block diagram showing an example method of selection a crop area according to an embodiment of the present invention;

FIG. 6 is an example flowchart illustrating a method of operating an example apparatus in accordance with an embodiment of the present invention; and FIG. 7 is an example block diagram of an example computing device for practicing embodiments of a media content processing system.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Referring now of FIG. 1, a system that supports communication, either wirelessly or via a wireline, between a computing device 10 and a server 12 or other network entity (hereinafter generically referenced as a "server") is illustrated. As shown, the computing device and the server may be in communication via a network 14, such as a wide area network, such as a cellular network or the Internet or a local area network. However, the computing device and the server may be in communication in other manners, such as via direct communications between the computing device and the server.

The computing device 10 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 12 may also be embodied by a computing device and, in one embodiment, is embodied by a web server. Additionally, while the system of FIG. 1 depicts a single server, the server may be comprised of a plurality of servers which may collaborate to support browsing activity conducted by the computing device.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

FIG. 3 shows a visual description of the vertigo effect or a dolly zoom application in effect. Dolly zoom is an effect achieved by setting of a zoom lens to adjust the angle of view, often referred to as a field of view, while the camera dollies, or moves, toward or away from a subject in such a way as to keep the subject the same size in the frame throughout. In its classic form, the camera is pulled away from a subject while the lens zooms in or vice versa. Thus, during the zoom, there is a continuous perspective distortion, the most directly noticeable feature being that the background appears to change relative to the subject.

FIG. 4 illustrates an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 4, when executed, convert a computer or processing circuitry into a particular machine configured to perform an example embodiment of the present invention. Accordingly, the operations of FIG. 4 define an algorithm for configuring a computer or processing to perform an example embodiment. In some cases, a general purpose computer may be provided with an instance of the processor which performs the algorithms of FIG. 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 4 is an example flowchart illustrating a method of operating an example media content processing system performed in accordance with an embodiment of the present invention. As shown in block 405 of FIG. 4, the apparatus 20 embodied by the computing device 10 may therefore be configured to execute an application. The apparatus embodied by the computing device therefore includes means, such as the processor 22, the communication interface 26 or the like, for executing an application. By way of example in which the executed application includes a web application, or any HTML5 or JavaScript™ application or "app", such as a computer software application that is coded in a browser-supported programming language (such as JavaScript™, combined with a browser-rendered markup language like HTML5, reliant on a common web browser to render the application executable). The opening of a web page or "app" may be performed by a web browser on a user's mobile communications device 10. An HTML5 or JavaScript™ "app" allows web page script to contact a server 12, such as those shown in FIG. 1, for storing and retrieving data without the need to re-download an entire web page. In another embodiment of the invention, the application may be a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings.

A specific example in the context of an embodiment of the present invention may be a cinematographic effect app. Once launched on a user's mobile phone or other programmable device, the app may be set record video and automatically adjust the zoom feature. Alternatively, the app may be configured to record video and apply the dolly zoom effect in video post processing.

As shown in block 410 of FIG. 4, the apparatus 20 embodied by the computing device 10 may therefore be configured to receive a first frame of a video data. The apparatus embodied by the computing device therefore includes means, such as the processor 22, the communication interface 26 or the like, for receiving a first frame of video data.

As shown in block 415 of FIG. 4, the apparatus 20 embodied by the computing device 10 may therefore be configured to select interest points. The apparatus embodied by the computing device therefore includes means, such as the processor 22, the communication interface 26 or the like, for selecting interest points. By way of example, the distance between the main subject's eyes may be selected as the interest points.

As shown in block 420 of FIG. 4, the apparatus 20 embodied by the computing device 10 may therefore be configured to save a descriptor for each interest point. The apparatus embodied by the computing device therefore includes means, such as the processor 22, the communication interface 26 or the like, for saving a descriptor for each interest point. Many known methods or algorithms exist for detecting and describing local features in images, such as SIFT or RIFF, any of which would be sufficient in the context of the present invention.

As shown in block 425 of FIG. 4, the apparatus 20 embodied by the computing device 10 may therefore be configured to output the first frame. The apparatus embodied by the computing device therefore includes means, such as the processor 22, the communication interface 26 or the like, for outputting the first frame. The first frame may be an image frame from video data. The video data may be a live signal. In an alternative embodiment, the video data may be previously recorded video data. Outputting the first frame may include sending the first frame to video display for presentation as a video or image. In an alternative embodiment, the first frame may be stored in memory.

As shown in block 430 of FIG. 4, the apparatus 20 embodied by the computing device 10 may therefore be configured to receive a second frame. The apparatus embodied by the computing device therefore includes means, such as the processor 22, the communication interface 26 or the like, for receiving a second frame. The second frame may be an image frame from video data. The video data may be a live signal or a signal from memory where the video data is stored.

As shown in block 435 of FIG. 4, the apparatus 20 embodied by the computing device 10 may therefore be configured to track the interest points. The apparatus embodied by the computing device therefore includes means, such as the processor 22, the communication interface 26 or the like, for tracking the interest points. Again, interest point tracking is known and may be implemented by any number of possible methods.

As shown in block 440 of FIG. 4, the apparatus 20 embodied by the computing device 10 may therefore be configured to calculate a scaling factor. The apparatus embodied by the computing device therefore includes means, such as the processor 22, the communication interface 26 or the like, for calculating a scaling factor. For example, let $X^m_n=(x^m_n,y^m_n)$ denote the automatically tracked interest points. Here, the automatically tracked position of interest point number m in frame number n is denoted by $X^m_n$. Now, in the simplest case of two tracked interest points on the primary subject, their distance in frame n is simply $d_n=\|X^1_n-X^2_n\|$ As shown in block 445 of FIG. 4, the apparatus 20 embodied by the computing device 10 may therefore be configured to apply the scaling factor. The apparatus embodied by the computing device therefore includes means, such as the processor 22, the communication interface 26 or the like, for applying the scaling factor. Specifically, to keep the apparent size of the subject constant throughout the video, the zoom factor scaling factor for each frame is set to $s_n=d_1/d_2$.

Scaling a subsequent video frame by this factor keeps the distance between two interest points, and therefore, the apparent size of the primary subject constant. In one embodiment of the present invention, applying the scaling factor may comprise adjusting the zoom feature of the camera on a mobile device. In another embodiment, the applying of the scaling factor may comprise selecting a crop area of a sensor or image area to present as the transformed image. By way of example, in this embodiment, when the camera is moved away from a main subject, the crop area is selected such that in the crop area, a ratio of distances, such as a distance between the eyes of a main subject and the distance of the height of the background image in the first image, are kept constant. See FIG. 5.

As shown in block 450 of FIG. 4, the apparatus 20 embodied by the computing device 10 may therefore be configured to update the interest point descriptors. The apparatus embodied by the computing device therefore includes means, such as the processor 22, the communication interface 26 or the like, for updating the interest point descriptors.

As shown in block 455 of FIG. 4, the apparatus 20 embodied by the computing device 10 may therefore be configured to output the transformed second frame. The apparatus embodied by the computing device therefore includes means, such as the processor 22, the communication interface 26 or the like, for outputting the transformed frame. Outputting of the transformed frame may include presenting the transformed image to a video display.

FIG. 6 is an example flowchart illustrating an alternative method of operating an example media content processing system performed in accordance with an embodiment of the present invention. Specifically, in one embodiment, for camera modules that may be equipped with an electronically controllable optical zoom, a zoom factor may be set in advance. As such, once frame number X has been recorded, the zoom may not be changed after the fact. In practice, this implementation of automatically rendering a dolly zoom effect, having observed the camera motion through frames 1 . . . X, may predict how a camera will move in very near future and set the scaling factor in advance for frame X+1.

Blocks 605, 610, 615, 620, 625, 630, and 635 coincide with blocks 405, 410, 415, 420, 425, 430 and 435 of FIG. 4, therefore, corresponding disclosure is omitted.

As shown in block 640 of FIG. 6, the apparatus 20 embodied by the computing device 10 may be configured to predict motion for subsequent frames. The apparatus embodied by the computing device may include means, such as the processor 22, the communication interface 26 or the like, for predicting motion for subsequent frames.

As shown in block 645 of FIG. 6, the apparatus 20 embodied by the computing device 10 may be configured to calculate a zoom setting. The apparatus embodied by the computing device may include means, such as the processor 22, the communication interface 26 or the like, for calculating a zoom setting.

As shown in block 650 of FIG. 6, the apparatus 20 embodied by the computing device 10 may be configured to apply the zoom setting to the camera module. The apparatus embodied by the computing device may include means, such as the processor 22, the communication interface 26 or the like, for applying the zoom setting to the camera module.

As shown in block 655 of FIG. 6, the apparatus 20 embodied by the computing device 10 may be configured to update interest point descriptors. The apparatus embodied by the computing device may include means, such as the processor 22, the communication interface 26 or the like, for updating interest point descriptors.

As shown in block 660 of FIG. 6, the apparatus 20 embodied by the computing device 10 may be configured to output the current frame. The apparatus embodied by the computing device may include means, such as the processor 22, the communication interface 26 or the like, for outputting the current frame.

FIG. 7 is an example block diagram of an example computing device for practicing embodiments of a media content processing system. In particular, FIG. 7 shows a system 20 that may be utilized to implement a media content processing system 710. Note that one or more general purpose or special purpose computing systems/devices may be used to implement the media content processing system 710. In addition, the system 20 may comprise one or more distinct computing systems/devices and may span distributed locations. Furthermore, each block shown may represent one or more such blocks as appropriate to a specific embodiment or may be combined with other blocks. For example, in some embodiments the system 20 may contain a tracking module 720, a scaling module 730, a camera module 780 or any combination of the three. In other example embodiments, the tracking module 720, the scaling module 730, or the camera module 780 may be configured to operate on separate systems (e.g. a mobile terminal and a remote server, multiple remote servers and/or the like). For example, the tracking module 720 and/or the scaling module 730 may be configured to operate on a mobile terminal 10. Also, the media content processing system 710 may be implemented in software, hardware, firmware, or in some combination to achieve the capabilities described herein.

While the system 20 may be employed, for example, by a mobile terminal 10, stand-alone system (e.g. remote server), it should be noted that the components, devices or elements described below may not be mandatory and thus some may be omitted in certain embodiments. Additionally, some embodiments may include further or different components, devices or elements beyond those shown and described herein.

In the embodiment shown, system 20 comprises a computer memory ("memory") 24, one or more processors 22 (e.g. processing circuitry) and a communications interface 26. The media content processing system 710 is shown residing in memory 24. In other embodiments, some portion of the contents, some or all of the components of the media content processing system 710 may be stored on and/or transmitted over other computer-readable media. The components of the media content processing system 710 preferably execute on one or more processors 22 and are configured to extract and classify the media content. Other code or programs 740 (e.g., an administrative interface, a Web server, and the like) and potentially other data repositories, such as data repository 750, also reside in the memory 24, and preferably execute on processor 22. Of note, one or more of the components in FIG. 7 may not be present in any specific implementation.

In a typical embodiment, as described above, the media content processing system 710 may include a tracking module 720, a scaling module 730 and/or both. The tracking module 720 and/or the scaling module 730 may perform functions such as those outlined in FIG. 1. The media content processing system 710 interacts via the network 14 via a communications interface 26 with (1) mobile terminals 760 and/or (2) with third-party content 770. The network 14 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 26 may be capable of operating with one or more air interface standards, communication protocols, modulation types, access types, and/or the like. More particularly, the system 20, the communications interface 26 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In an example embodiment, components/modules of the media content processing system 710 may be implemented using standard programming techniques. For example, the media content processing system 710 may be implemented as a "native" executable running on the processor 22, along with one or more static or dynamic libraries. In other embodiments, the media content processing system 710 may be implemented as instructions processed by a virtual machine that executes as one of the other programs 740. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the media content processing system 710, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the media content processing system 710 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    causing reception of a first image frame from video data, wherein the first image frame comprises at least two sets of two or more interest points;
    causing reception of a second image frame from the video data, wherein the second image frame comprises the two sets of two or more interest points in a different location;
    tracking a difference in location of the two or more interest points from the first image frame to the second image frame;
    calculating a scaling factor representing a relative difference in placement of the two or more interest points;
    transforming the second image frame by applying the scaling factor; and
    causing presentation of the transformed second image frame, wherein the transformed second image frame is a crop area of an image area, the crop area being selected such that in the crop area, a ratio of distances between the two sets of two or more interest points remains constant.

2. The method of claim 1 further comprising:
    receiving a selection of the two or more interest points in the first image frame.

3. The method of claim 1 further comprising receiving selection of a main subject in the first image frame and selecting the two or more interest points in accordance with the selection of the main subject.

4. The method of claim 1 further comprising:
    causing a descriptor for each of the two or more interest points to be stored; and
    updating the descriptor for each of the two or more interest points in response to the calculation of the scaling factor.

5. The method of claim 1 further comprising causing a prediction of camera motion for subsequent image reception, wherein applying the scaling factor comprises causing adjustment of a zoom feature of a camera device; and causing a setting of the zoom feature in advance of the subsequent image reception.

6. The method of claim 1 wherein applying the scaling factor comprises selecting a crop area such that a ratio of distances between two sets of interest points is kept constant.

7. An apparatus comprising at least one processor and at least one memory including computer program code, the at least one memory and the computer program code configured to, with the processor, cause the apparatus to at least:
    cause reception of a first image frame from video data, wherein the first image frame comprises at least two sets of two or more interest points;
    cause reception of a second image frame from the video data, wherein the second image frame comprises the two or more interest points in a different location;
    track a difference in location of the two or more interest points from the first image frame to the second image frame;
    calculate a scaling factor representing a relative difference in placement of the two sets of the two or more interest points;
    transform the second image frame by applying the scaling factor; and
    cause presentation of the transformed second image frame, wherein the transformed second image frame is a crop area of an image area, the crop area being selected such that in the crop area, a ratio of distances between the two sets of two or more interest points remains constant.

8. The apparatus according to claim 7, wherein the at least one memory and the computer program code are further configured to, with the processor, cause the apparatus to receive a selection of the two or more interest points in the first image frame.

9. The apparatus according to claim 7, wherein the at least one memory and the computer program code are further configured to, with the processor, cause the apparatus to receive selection of a main subject in the first image frame and select the two or more interest points in accordance with the selection of the main subject.

10. The apparatus according to claim 7, wherein the at least one memory and the computer program code are further configured to, with the processor, cause the apparatus to:
   cause a descriptor for each of the two or more interest points to be stored; and
   update the descriptor for each of the two or more interest points in response to the calculation of the scaling factor.

11. The apparatus according to claim 7, wherein the at least one memory and the computer program code are further configured to, with the processor, cause the apparatus to: cause a prediction of camera motion for subsequent image reception, wherein applying the scaling factor comprises causing adjustment of a zoom feature of a camera device; and cause a setting of the zoom feature in advance of the subsequent image reception.

12. The apparatus according to claim 7, wherein applying the scaling factor comprises selecting a crop area such that a ratio of distances between two sets of interest points is kept constant.

13. A computer program product comprising at least one non-transitory computer-readable storage medium having computer-executable program code portions stored therein, the computer-executable program code portions comprising program code instructions for:
   causing reception of a first image frame from video data, wherein the first image frame comprises at least two sets of two or more interest points;
   causing reception of a second image frame from the video data, wherein the second image frame comprises the two or more interest points in a different location;
   tracking a difference in location of the two or more interest points from the first image frame to the second image frame;
   calculating a scaling factor representing a relative difference in placement of the two sets of the two or more interest points;
   transforming the second image frame by applying the scaling factor; and
   causing presentation of the transformed second image frame, wherein the transformed second image frame is a crop area of an image area, the crop area being selected such that in the crop area, a ratio of distances between the two sets of two or more interest points remains constant.

14. The computer program product according to claim 13, wherein the computer-executable program code portions further comprise program code instructions for:
   receiving a selection of the two or more interest points in the first image frame.

15. The computer program product according to claim 13, wherein the computer-executable program code portions further comprise program code instructions for:
   receiving selection of a main subject in the first image frame and selecting the two or more interest points in accordance with the selection of the main subject.

16. The computer program product according to claim 13, wherein the computer-executable program code portions further comprise program code instructions for:
   causing a descriptor for each of the two or more interest points to be stored; and
   updating the descriptor for each of the two or more interest points in response to the calculation of the scaling factor.

17. The computer program product according to claim 13, wherein the computer-executable program code portions further comprise program code instructions for: causing a prediction of camera motion for subsequent image reception, wherein applying the scaling factor comprises causing adjustment of a zoom feature of a camera device; and causing a setting of the zoom feature in advance of the subsequent image reception.

18. The computer program product according to claim 13, wherein applying the scaling factor comprises selecting a crop area such that a ratio of distances between two sets of interest points is kept constant.

* * * * *